No. 723,020. PATENTED MAR. 17, 1903.
E. F. PONATH.
GRAIN SHOCKER.
APPLICATION FILED DEC. 27, 1901.

NO MODEL. 7 SHEETS—SHEET 1.

WITNESSES.
INVENTOR
EMIL F. PONATH
BY
ATTORNEYS.

No. 723,020. PATENTED MAR. 17, 1903.
E. F. PONATH.
GRAIN SHOCKER.
APPLICATION FILED DEC. 27, 1901.
NO MODEL. 7 SHEETS—SHEET 5.

WITNESSES.
E. G. Staude
M. C. Noonan

INVENTOR
EMIL F. PONATH
BY Paul & Paul,
ATTORNEYS.

No. 723,020. PATENTED MAR. 17, 1903.
E. F. PONATH.
GRAIN SHOCKER.
APPLICATION FILED DEC. 27, 1901.
NO MODEL. 7 SHEETS—SHEET 7.

WITNESSES
E. G. Staude
M. C. Noonan

INVENTOR
EMIL F. PONATH
BY Paul & Paul,
ATTORNEYS.

THE NORRIS PETERS CO., PHOTO-LITHO., WASHINGTON, D. C.

UNITED STATES PATENT OFFICE.

EMIL F. PONATH, OF GREATBEND, NORTH DAKOTA.

GRAIN-SHOCKER.

SPECIFICATION forming part of Letters Patent No. 723,020, dated March 17, 1903.

Application filed December 27, 1901. Serial No. 87,475. (No model.)

*To all whom it may concern:*

Be it known that I, EMIL F. PONATH, of Greatbend, Richland county, North Dakota, have invented certain new and useful Improvements in Grain-Shockers, of which the following is a specification.

The object of this invention is to provide means for rapidly standing the bundles of grain up on end to form a shock and leaving them in an upright position as the binder moves along.

A further object is to provide a shocker which will stand the bundles up in substantially the same way and form a shock as erect and stable as when set up by hand.

Other objects of the invention will appear from the following detailed description.

The invention consists generally in various constructions and combinations, all as hereinafter described, and particularly pointed out in the claims.

In the accompanying drawings, forming part of this specification.

In the drawings, 2 and 3 represent, respectively, the upper and lower grain-elevators, 4 the wheel, and 5 the grain-table, of an ordinary binder. Above the grain-table is the knotter mechanism 6 and beneath the packer-arms 7, operating through said table in the usual way. Beneath the packer-arms are parallel tubes 8, usually found in binders of this character, and upon these tubes, near the front and back of the machine, I secure castings 9, having ears or lugs 10, upon which the bars 11 are pivoted and adapted to oscillate vertically. These bars slide with the castings and with the tubes 8 to adapt the shocker-pans to the various positions of the grain-table, which is moved back and forth according to the length of the grain that is being cut and bound. Bolted to the bars 11 is a U-shaped horizontal frame 12, whereon the shocker-pans are pivoted. Any suitable means may be provided for supporting the outer side of said frame; but I prefer to provide an arm 13, pivoted on a standard 14 on the frame of the machine and connected by a rod 15 with said frame. The inner end of the arm 13 has a flexible connection with a windlass device 16, by means of which the outer end of said frame may be raised and lowered to adjust the position of the shocker frame and pans with respect to the surface over which the binder is operating. Where the field is level, the shocking apparatus will be adjusted in substantially the position shown in the drawings; but if the binder is operating on a hillside then the pans will be raised or lowered to adjust them in their proper position with respect to the grain-table.

17 and 18 represent the shocker-pans, that are semicylindrical in form, made, preferably, of sheet metal of suitable weight, and placed end to end horizontally, the pan 18 being beneath the discharge end of the table 5, between which table and said pan I prefer to provide a horizontal deck 19, whereon the bundles are piled and retarded during the operation of forming the shock. The pans are provided with curved straps 20 and 21, arranged, respectively, near the middle of the pans, the strap 20 being pivoted to one end of the bars 22, the opposite ends of said bars being pivoted near the end of their pan to the frame, while the strap 21 is pivoted directly on the frame. In front of the deck 19, between it and the pan 18, I provide a board 23, secured on a bar 24, that is pivoted on the frame 12 at a point substantially opposite the middle of the other pan. This bar has curved edges 25, adapted to be engaged by a pin 26 on the bar 22, and when the pan 18 is raised to dump its contents into the other pan or to aid in forming the shock the bar 24, actuated by the engagement of the pin 26 therewith, will raise the board 23 in front of the deck 19 and prevent the discharge of the bundles therefrom until such time as the pan has returned to its normal horizontal position and is ready to receive the bundles to form another shock. In this way a premature discharge of the bundles from the grain-table into the receiving-pan is prevented. Above the frame and pans is an arched frame 27, whereon a series of pulleys 28, 29, and 30 are mounted within a suitable bracket 31.

32 represents a gear on the shaft of the upper grain-elevator meshing with a gear 33 on a shaft 34, that is mounted in suitable bearings 35 on the frame of the binder. Loosely mounted on the shaft 34 are drums 36 and 37, that are adapted to be locked on the said shaft by clutches 38, operated by levers 39 and 40. These levers may be operated by any suitable hand or foot power mechanism, which I have not thought necessary to illustrate or describe in this application. The levers 39 and 40 are pivoted near their clutches and are provided with lateral-extending arms 41 and 42, which have loops near their ends to receive cables 43 and 44, that are secured, respectively, on the drums 36 and 37 and are adapted to be wound thereon when said drums are revolved. The drums are locked on the shaft by the movement of the levers 39 and 40, and in order that the clutches may be automatically disengaged when a certain predetermined amount of cable has been wound upon either of the drums I prefer to provide collars 45 and 46 on said cables, which upon engaging the looped ends of the arms 41 and 42 will oscillate said levers away from the drums and disengage the clutch mechanisms. The cable 43 extends around the pulley 28 to the eye 47, provided on the strap 20. As soon as the desired number of bundles have been deposited in the pan 18 the operator will throw the clutch device to lock the drum 36, and the cable 43 will be wound thereon, raising the pan 18 on the pivoted bars 22 until it is substantially in the position shown in Fig. 6, where its contents will be dumped into the other pan. To return said pan to its normal position after it has discharged its contents, I prefer to provide curved rods 48, secured to the bars 22 a suitable distance from their pivots and slidable through holes in plates 49, that are secured to the frame 12. Between the plates 49 and pins provided in the outer ends of said rods I arrange coil-springs 50, that are compressed by the tilting of said pan and cause the same to return to its normal position when the lifting-cable is released. The other pan is equipped in a similar manner except that the rods are secured directly to the sides of the pan instead of to the pivoted bars, as described with reference to the pan 18. The pan 18 having discharged its load into the other pan will be automatically returned to its normal position, the clutch mechanism being automatically released to allow the drum to unwind the cable and the bundles that have accumulated on the deck to be discharged into the pan until it is filled again. The pans are then tilted simultaneously by the mechanism which I will now proceed to describe. The cable 44 is provided with a pulley 51, around which a cable 52 passes, that runs over the pulleys 29 and 30 and has its ends carried down over arched straps 53, provided at the end of each pan for the purpose of holding the cable up sufficiently high above the pans to clear the bundle therein. On the under side of each pan, near the outer ends thereof, are bell-cranks 54 and 55, to one arm of which the ends of the cable 52 are attached. The other arm of each crank is connected by links 56 and 57 with bell-cranks 58 and 59, the former being connected by links 60 with sliding latches 61, provided upon each side of the pan 17, within casings 62 thereon. Each catch has a spindle 63, slidable in the end of said casing and provided with a spring 64, which normally holds said catch projected into a notch 65, provided in the frame 12. Oscillation of the bell-cranks 54 and 58 will withdraw the catches from engagement with said frame and permit the pan 17 to be tilted. To prevent downward tilting of the outer end of said pan when in its normal position, I prefer to provide ears 66, adapted to engage the top of the shocker-frame. The bell-cranks 59, provided upon each side of the pan 18, are pivotally connected with sliding pins or latches 67, arranged to reciprocate within guides 68 on the wall of the pan and engage notches 69 in the bars 22 near the point where they are pivoted on the pan 18. These pins permit tilting of the pan 18 and the bars 22 to raise the pan up into position to discharge its contents into the other pan, but prevent the independent tilting of said pan until power is applied to the cable to withdraw the locking-latches.

Figure 1:
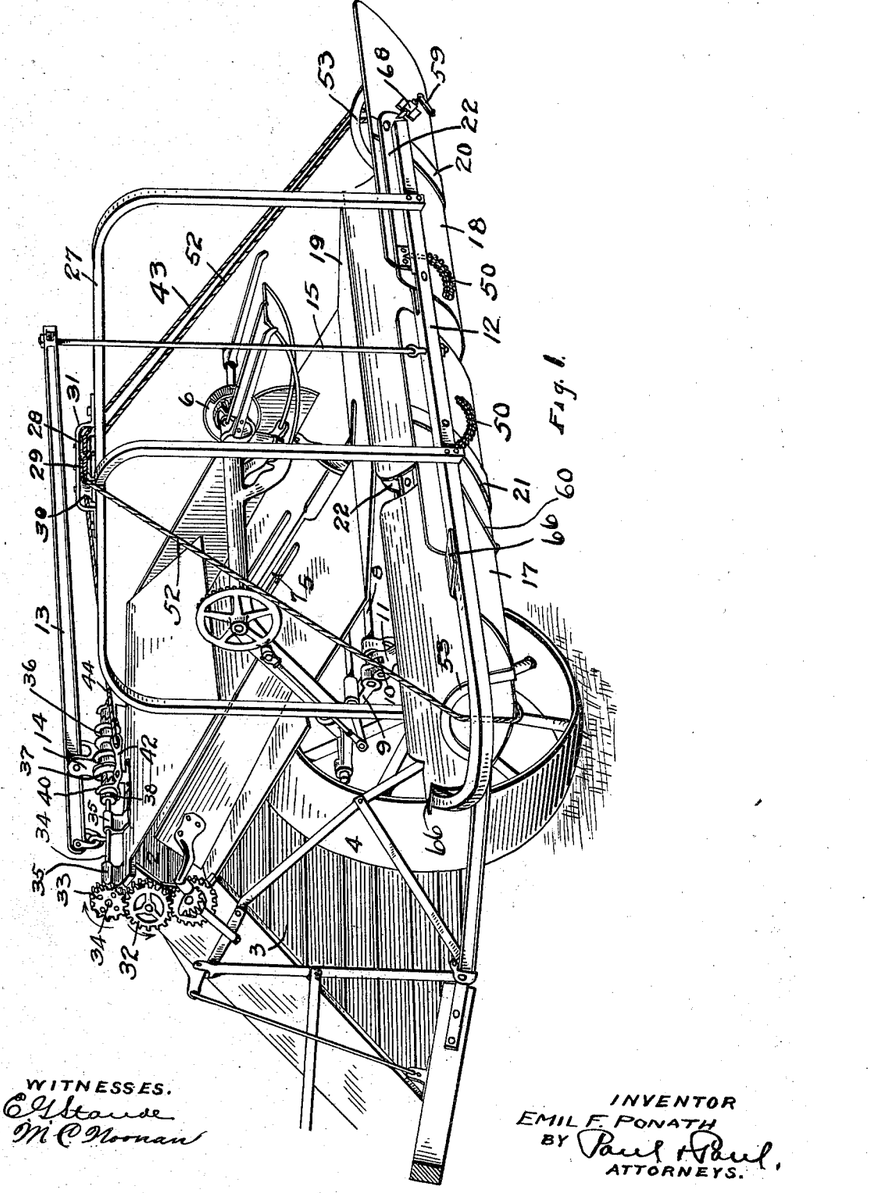
Figure 1 is a perspective of a grain-binder with my invention attached thereto.
Figure 2:
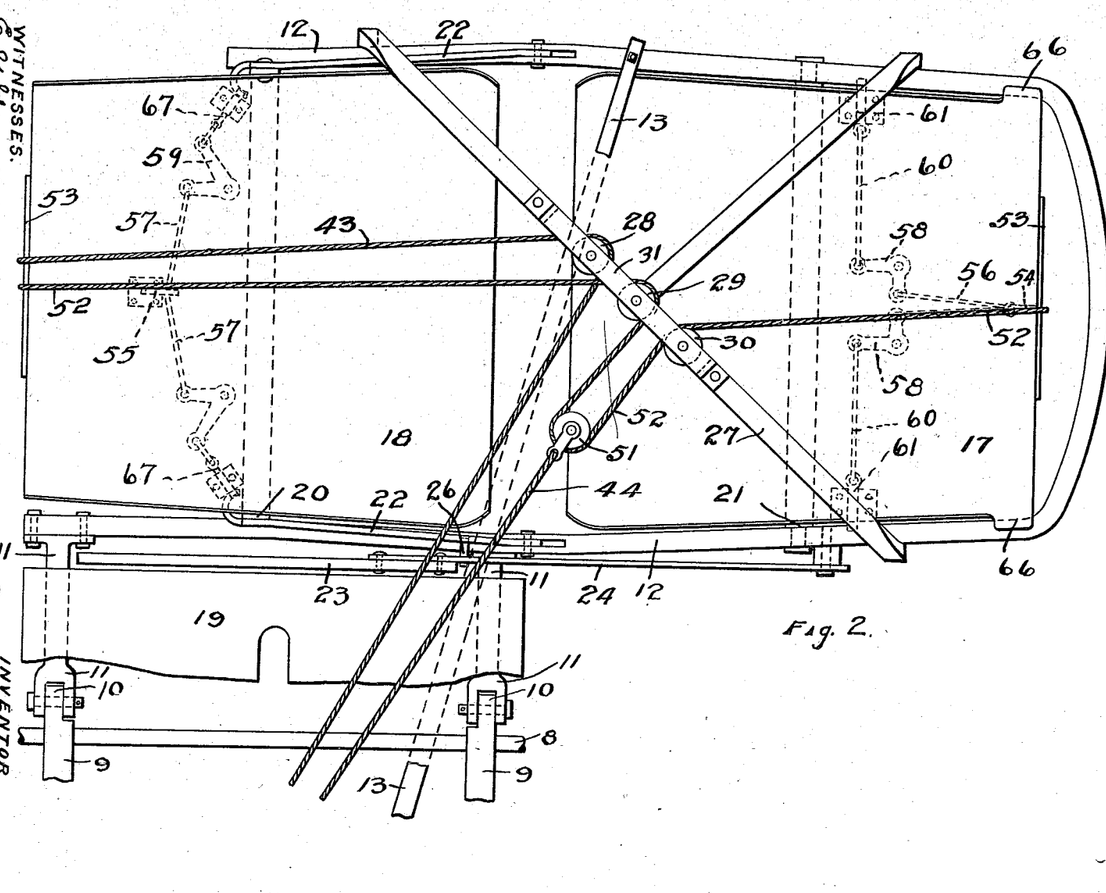
Fig. 2 is a plan view.
Figure 3:
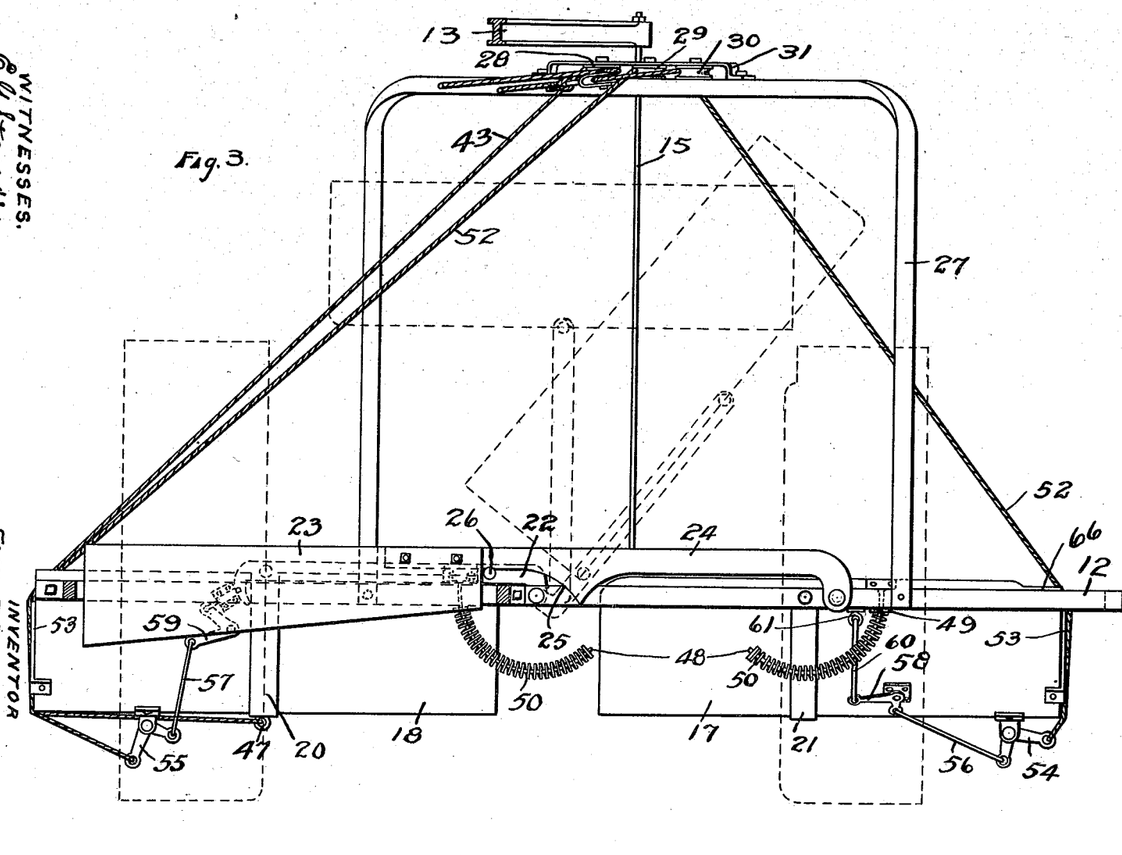
Fig. 3 is a side elevation, partially in section, showing the normal position of the pans, the position that they assume in the various steps of the operation being indicated by dotted lines.
Figure 4:
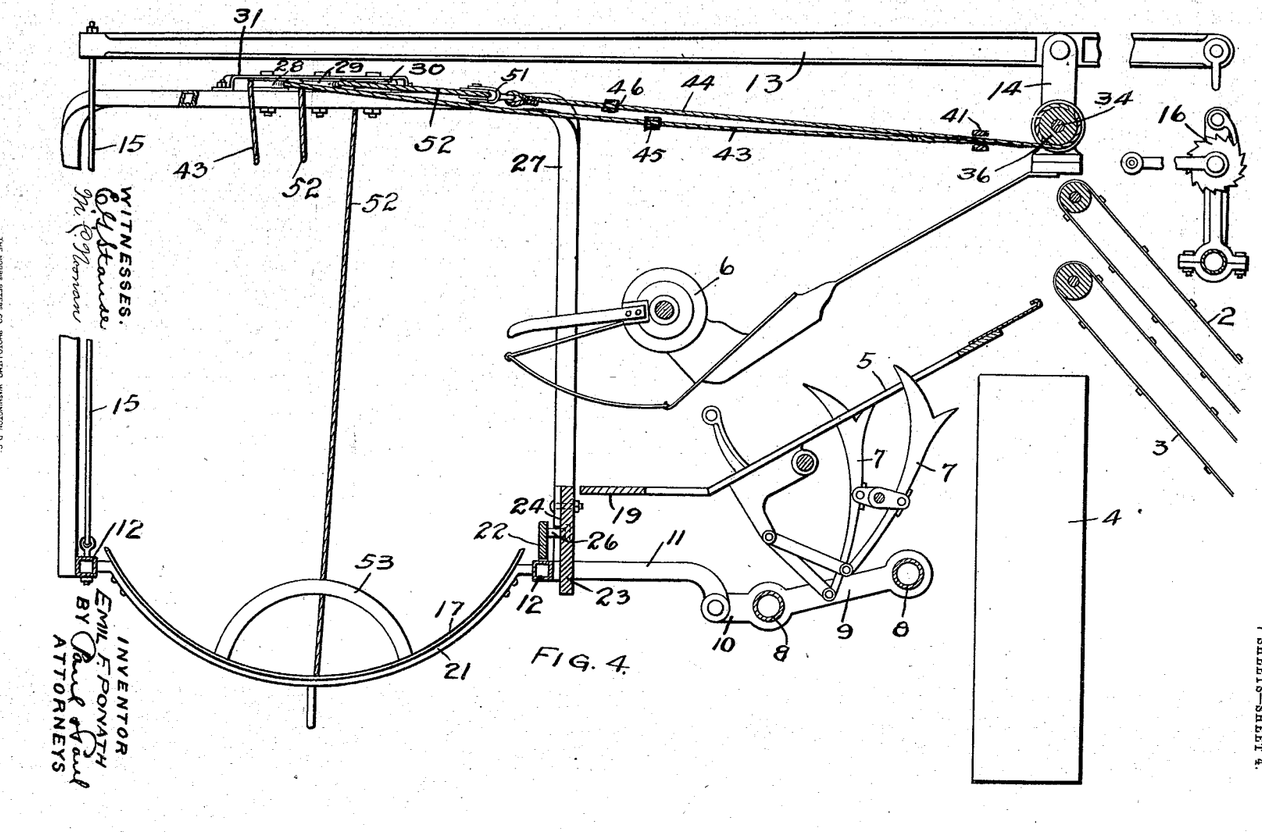
Fig. 4 is a rear view, also in section, showing the manner of attaching the pans to the binder, the mechanism for operating the pans, and the table wherefrom the bundles are delivered to the pans.
Figures 5, 6:
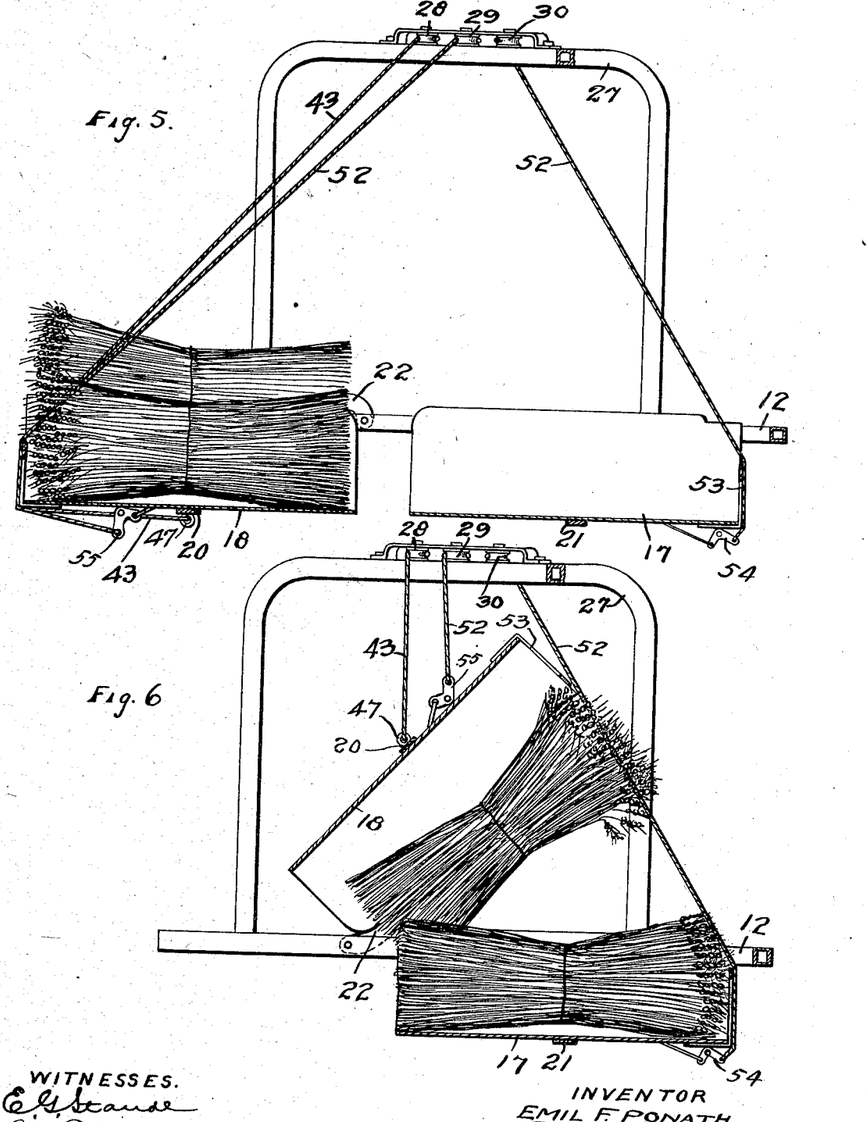
Fig. 5 is a view showing the pans, one of them containing bundles of grain ready to be dumped into the other pan.
Fig. 6 is a similar view showing one pan in the act of dumping its contents into the other.
Figure 7:
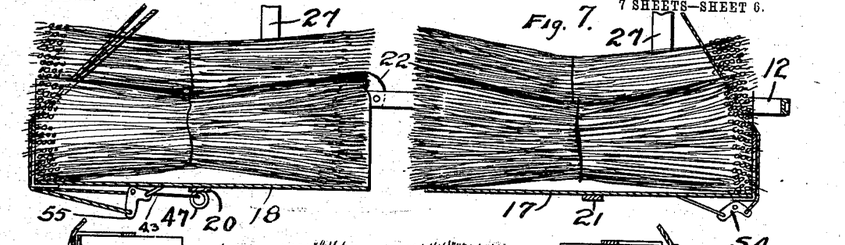
Fig. 7 is a detail view showing both pans filled with bundles.
Figure 8:
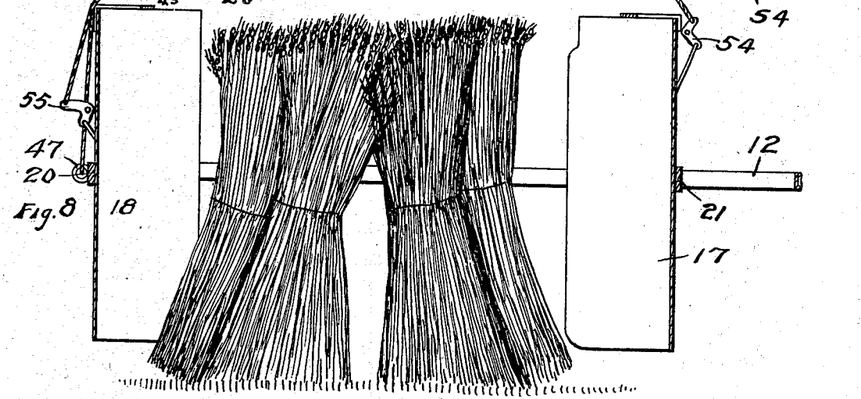
Fig. 8 shows the pans in their tilted position to form the shock.
Figure 9:
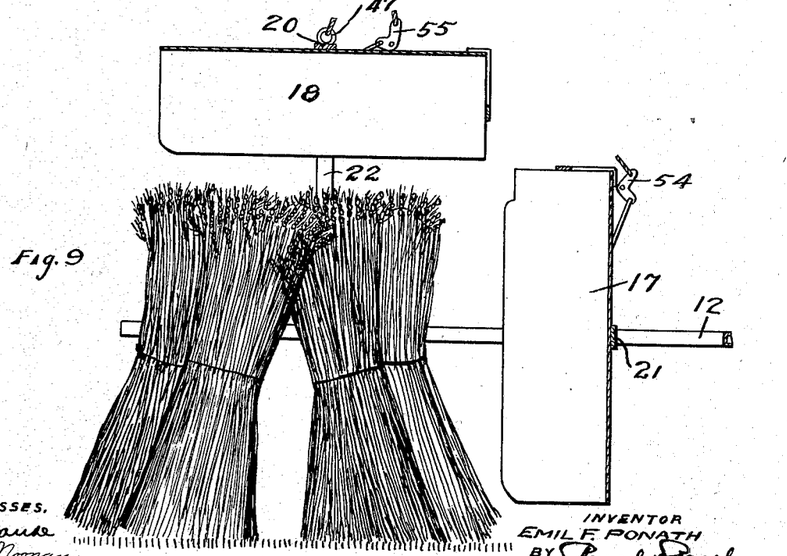
Fig. 9 shows one of the pans elevated sufficiently to clear the shock and prevent it from being knocked down as the binder moves along.
Figures 10, 11, 12, 13, 14, 15, 16, 17:
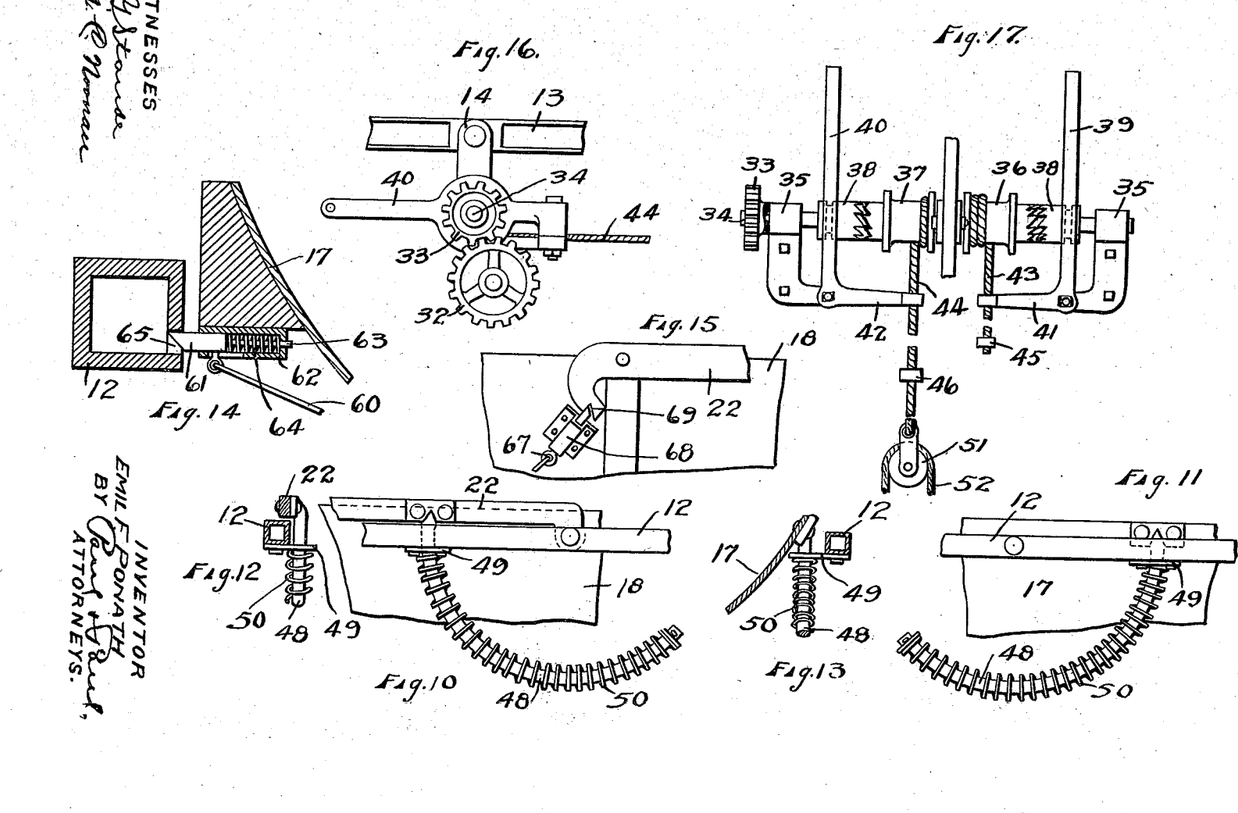
Figs. 10, 11, 12, and 13 are details of the spring devices for returning the pans to their normal position after being tilted.
Figs. 14 and 15 are details of the latch devices for locking the pans.
Figs. 16 and 17 are details of the clutch mechanism for controlling the movement of the pans.

The operation of my improved grain-shocker is as follows: The pans having been adjusted in their proper position with respect to the grain-table to permit the discharge of bound bundles therefrom into the pan 18 and a sufficient number of bundles having been delivered to said pan the person in charge of the machine will operate the lever 39 to lock the drum 36 on its shaft and wind the cable 43 thereon. This cable being connected, as heretofore described, to the eye 47 on the under side of the pan 18 will as the drum is revolved cause said pan to be tilted on the pivots of the bars 22 on said frame, movement of said pan independent of said bars being prevented by the locking-latches. The pan, filled with bound bundles preparatory to dumping, will have the appearance shown in Fig. 5, which illustrates the pan just after it is loaded and before the operator tilts the same to dump its contents into the other pan. Fig. 6 shows the pan 18 elevated and in the act of dumping its load into the pan 17. As soon as the load is dumped the collar 45 engaging the arm 41 will automatically disengage the clutch, and the spring devices heretofore described return the pan to its normal position. During the tilting operation of the pan several bundles have accumulated on the deck and are prevented from being discharged by the vertical swinging guard-board heretofore described. As soon as the pan 18 returns to its horizontal position in front of the deck the guard-board will descend also and allow the accumulated bundles to fill the pan, when the two pans will present an appearance substantially as shown in Fig. 7. Both pans having now been loaded the operator will throw the lever 40, causing the cable 44 to be wound on its drum and disengage both locking devices on the pans and tilting them on their pivots to a vertical position, as shown in Fig. 8. This tilting of the pans is done rapidly, and the bundles will slide out and strike on end with sufficient force in the stubble to render the bundles as firm and stable in their position as though placed there by hand. The discharge of the bundles from the pans will cause them to lean in at the top and form a shock substantially the same in form and, if preferred, containing as many bundles as the shocks made by hand. The drum will continue to wind up the cable after the pans are tilted; but one of the pans 17 will remain substantially stationary in its tilted position, having reached the limit of its movement. The other pan, however, being mounted on the bars 22 will as the cable continues to be wound be raised up with said bars on their pivots until it is raised clear over the top of the shock, as illustrated in Fig. 9. This movement of the pan 18 will be permitted by the connection of the cable 52 therewith, said cable sliding on its pulleys and giving its slack to the pan 17 while the pan 18 is being elevated.

Each time a shock is formed the receiving-pan will be elevated, so that as the binder travels along the pan will clear the top of the shock and leave it standing in an upright position.

The principal objection to many of the shockers now in use is that after forming the shock on the table, as is usually done, there is great danger of its falling or being knocked down when the table is withdrawn as the binder moves along. With my apparatus, however, a shock is quickly formed and is left as erect and stable as though formed by hand. As soon as the elevated pan has cleared the shock the collar 46 will engage the arm 42, disengage the clutch mechanism, and allow the weight of the pans and the spring devices to return them to their normal position, when the operation is repeated as before. The shocker apparatus may be adjusted in any suitable position in front of the grain-table, according to the length of the grain to be bound and shocked.

I do not wish to be confined to the particular means described for locking the pans to prevent premature tilting thereof or to the means provided for tilting the pans when loaded, as I am aware that the same is capable of various modifications which would suggest themselves to any one skilled in the art.

I claim as my invention—

1. The combination, with a grain-binder, of bundle-receiving receptacles pivoted at points intermediate to their ends and substantially in line with each other and having contiguous discharge ends whereon the bundles are placed butt to butt, and means for tilting said receptacles toward each other and discharging the bundles on end between them, the separation of the contiguous ends of said receptacles when tilted allowing the butts of the bundles to spread and form the base of the shock while the tops of the bundles are pressed or crowded together by the convergence of the non-contiguous ends of said receptacles.

2. The combination, with a grain-binder, of tilting pans, to one of which the bundles are delivered, means for tilting said bundle-receiving pan to discharge its contents into the other pan, and means for tilting both said pans toward each other simultaneously to discharge the bundles on end upon the ground to form the shock.

3. The combination, with a grain-binder, of tilting pans, to one of which the bundles are delivered, means for tilting said bundle-receiving pan to discharge its contents into the other pan, means for tilting both said pans toward each other simultaneously to discharge the bundles on end and form the shock and for raising the rear pan to clear the completed shock.

4. In a grain-binder, the combination, with the grain-table, of the deck whereon the bound bundles are deposited, tilting pans provided near said table, one of said pans being opposite said deck to receive the bound bundles therefrom, means for tilting said pans, means for preventing the discharge of bundles from said deck during the tilting operation, and means for raising one of said pans to clear the completed shock.

5. In a grain-binder, the combination, with a grain-table, of horizontally-arranged tilting pans placed end to end near said table and whereto the bundles of grain are delivered, means for tilting said pans toward each other simultaneously to discharge the bundles on end and form the shock, and means for elevating the rear pan to prevent its engagement with the shock as the binder moves along.

6. In a grain-binder, the combination, with a grain-table, of a deck whereon the bound bundles are delivered, tilting pans provided near said table, one of said pans being opposite said deck to receive the bound bundles therefrom, means for tilting said pans toward each other to discharge the bundles on end and form the shock, and a vertically-swinging guard-board provided between said receiving-pan and said deck to prevent the discharge of bundles from said deck during the tilting operation.

7. A shocker, comprising bundle-receiving pans or trays placed end to end and pivoted at points intermediate to their ends, means for tilting said pans toward each other, the separation of the abutting or inner ends of the pans allowing the butts of the bundles to spread and form the base of the shock, while their tops are crowded or thrown together by the convergence of the outer ends of said pans, and means for lifting one of the pans to clear the completed shock.

8. The combination, with a grain-binder, of shock-forming pans provided near the grain-table and whereto the bundles of bound grain are delivered, means for locking said pans in their normal horizontal position, means for tilting one of said pans independently of its locking mechanism to discharge its contents into the other pan, and means for tilting both said pans simultaneously toward each other to discharge the bundles therein on end and form the shock, and for raising the rear pan to clear the top of the shock, for the purpose specified.

9. The combination, with a grain-binder, of a frame pivotally suspended near the grain-table and having a vertically-swinging movement on its pivots, shock-forming pans pivoted end to end in said frame, to one of which pans the bound bundles of grain are delivered, means for tilting said receiving-pan to discharge its contents into the other pan, and means for simultaneously tilting both said pans toward each other to discharge the bundles on end and form the shock.

10. The combination, with the grain-binder, of a frame pivoted near the grain-table and adapted to swing vertically on its pivots, means for raising and lowering said frame, shock-forming pans pivotally supported in said frame, one of said pans being opposite the discharge end of said table to receive the bound bundles therefrom, means for tilting said receiving-pan to discharge its contents into the other pan, and means for tilting both said pans simultaneously toward each other to discharge the bundles on end and form the shock, and for elevating the rear pan to clear the shock, substantially as described.

11. The combination, with a grain-binder, of a vertically-swinging frame provided near the grain-table, means for raising and lowering said frame, shock-forming pans pivotally arranged end to end in said frame and adapted to receive the bundles of bound grain from said table, and means for tilting said pans toward each other to discharge the bundles on end and form the shock.

12. The combination, with a grain-binder, of the frame provided near the grain-table, a bundle-receiving pan, bars pivoted in said frame and to said receiving-pan near the middle thereof, a second pan centrally pivoted in said frame, means for locking said pans in a horizontal position, means for raising said receiving-pan on the pivots of said bars in said frame to discharge the contents of said receiving-pan into the other pan, and means for unlocking said pans and tilting them on their central pivots toward each other to discharge the bundles on end and form the shock, substantially as described.

13. The combination, with a grain-binder, of the frame provided near the grain-table, pans centrally pivoted in said frame and arranged end to end and whereto the bundles of bound grain are delivered, means for tilting said pans toward each other to discharge the bundles on end and form the shock, and spring devices for returning said pans to their normal position after the discharge of their contents.

14. In a grain-binder, the combination, with the tilting semicylindrical shock-forming pans placed end to end, to one of which pans the bound bundles of grain are delivered, means for tilting said bundle-receiving pan to raise the same above the other pan to discharge its contents therein and to clear the completed shock when formed, and means for tilting both said pans toward each other simultaneously to discharge the bundles therein on end and form the shock.

15. The combination, with a grain-binder, of the frame secured thereon, shock-forming pans pivotally supported in said frame to one of which the bound bundles of grain are delivered, a clutch and cable-winding mechanism within control of the operator, a cable connecting said receiving-pan and said winding mechanism, whereby said pan may be tilted to dump its contents into the other pan, a second cable-winding and clutch mechanism, and a second cable connecting said second winding mechanism with both said pans for tilting them simultaneously toward each other to discharge the bundles on end and form the shock.

16. The combination, with a grain-binder, of a frame supported thereon near the grain-table, shock-forming pans, to one of which the bound bundles are delivered, bars pivoted in said frame and whereon said receiving-pan is pivoted, the other pan being pivoted in said frame near said receiving-pan, latch devices to prevent tilting of said pans on their pivots, means for raising said receiving-pan on the pivots of said bars to discharge its contents into the other pan and for clearing the shock when formed, and means for operating said latches to unlock said pans and tilt them on their pivots toward each other simultaneously to discharge the bundles on end and form the shock, substantially as described.

17. The combination, with a grain-binder, of bundle-receiving receptacles pivoted intermediate to their ends and horizontally arranged end to end and in line substantially with each other and whereon the bundles are deposited butt to butt, means for tilting said receptacles toward each other, the separation of the abutting or contiguous ends of said receptacles when tilted allowing the butts of the bundles to spread and form the base of the shock while their tops are crowded together by the convergence of the non-contiguous ends of said receptacles, and means for changing the angle of said receptacles with respect to the binder to adapt them to the character of the ground where used.

18. The combination, with a grain-binder, of members adapted to receive the bundles of grain, means for dumping said members toward each other simultaneously to discharge the bundles on end and form the shock, and means for raising one of said members to clear the completed shock as the binder moves along.

19. The combination, with a grain-binder, of a frame hinged thereon, members pivoted in said frame and arranged end to end to receive the bundles placed butt to butt, means for tilting said members toward each other simultaneously to discharge the bundles on end and form the shock, and means for raising or lowering said frame to vary the adjustment of it and said members with respect to said binder.

20. The combination, with a grain-binder, of oscillating bundle-receptacles supported thereon and adapted to receive the bound bundles of grain, means for tilting said bundle-receptacles toward each other to discharge the bundles on end between them, means for raising one of said receptacles to clear the completed bundles, and means for changing the angle of said receptacles with respect to said binder.

21. The combination, with a grain-binder, of bundle-receptacles placed end to end and adapted to receive the bound bundles of grain, means for tilting said receptacles toward each other to discharge the bundles therefrom and form the shock, and means for moving one of said receptacles to clear the completed shock.

22. In a binder, an adjustable grain-table, in combination, with tilting shock-forming receptacles pivoted intermediate to their ends and placed end to end in line with each other near the discharge side of said table and adjustable therewith and whereto the bound bundles are delivered butt to butt, means for tilting said receptacles toward each other simultaneously to form the shock, the separation of the abutting or inner ends of said receptacles allowing the butts of the bundles to spread and form the base of the shock while their tops are crowded together by the convergence of the outer ends of said receptacles.

23. In a grain-binder, the combination, with the grain-table, of a frame supported adjacent thereto, shock-forming receptacles horizontally pivoted in said frame at points intermediate to their ends, said receptacles being placed end to end and substantially in line with each other and whereon the bundles are placed butt to butt, and means for swinging said receptacles on their pivots to discharge the bundles toward each other between them, the separation of the abutting inner ends of said receptacles allowing the butts of the bundles to spread and form the base of the shock while the tops of the bundles are pressed or crowded together by the convergence of the non-contiguous outer ends of said receptacles.

24. A shocker, comprising bundle-receiving pans or trays pivoted intermediate to their ends and placed end to end and substantially in line with each other, means for tilting one of said pans to discharge the bundles deposited therein into the other pan, and means for tilting both said pans toward each other simultaneously to discharge the bundles on end and form the shock, the separation of the contiguous or abutting inner ends of said pans allowing the butts of the bundles to spread and form the base of the shock while their tops are crowded or pressed together by the convergence of the non-contiguous outer ends of said pans.

25. A shocker, comprising bundle-receiving pans or trays pivoted intermediate to their ends and placed end to end and substantially in line with each other, means for tilting one of said pans to discharge the bundles deposited therein into the other pan, means for simultaneously tilting both said pans toward each other to discharge the bundles on end between them and form the shock, the separation of the abutting or inner ends of the pans allowing the butts of the bundles to spread and form the base of the shock while their tops are crowded or thrown together by the convergence of the non-contiguous outer ends of said pans, and means for moving one of the said pans to clear the completed shock.

In witness whereof I have hereunto set my hand this 19th day of December, 1901.

EMIL F. PONATH.

In presence of—
  F. O. HUNGER,
  CARL PASBRIG.